(12) United States Patent
Guan

(10) Patent No.: US 9,526,150 B1
(45) Date of Patent: Dec. 20, 2016

(54) LED CALIBRATION STANDARD HAVING FAST STABILIZATION AND LASTING STABILITY

(71) Applicant: KLA-Tencor Corporation, Milpitas, CA (US)

(72) Inventor: Yu Guan, Pleasanton, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/242,371

(22) Filed: Apr. 1, 2014

Related U.S. Application Data

(60) Provisional application No. 61/807,659, filed on Apr. 2, 2013.

(51) Int. Cl.

| | |
|---|---|
| *H01J 7/24* | (2006.01) |
| *H01J 13/32* | (2006.01) |
| *H01J 17/28* | (2006.01) |
| *H01J 19/74* | (2006.01) |
| *H01J 61/52* | (2006.01) |
| *H05B 37/02* | (2006.01) |
| *B60Q 1/14* | (2006.01) |
| *F21S 8/10* | (2006.01) |
| *H05B 33/08* | (2006.01) |
| *F21Y 101/02* | (2006.01) |
| *F21Y 103/00* | (2016.01) |

(52) U.S. Cl.
CPC ............. *H05B 37/0227* (2013.01); *B60Q 1/14* (2013.01); *B60Q 1/143* (2013.01); *B60Q 1/1407* (2013.01); *B60Q 1/1415* (2013.01); *B60Q 1/1423* (2013.01); *B60Q 1/1438* (2013.01); *B60Q 1/1446* (2013.01); *F21S 48/00* (2013.01); *F21Y 2101/02* (2013.01); *F21Y 2103/003* (2013.01); *H05B 33/0869* (2013.01); *H05B 33/0872* (2013.01); *H05B 37/02* (2013.01)

(58) Field of Classification Search
CPC ............ F21Y 2101/02; F21Y 2103/003; H05B 37/02; H05B 33/0872; H05B 33/0869; B60Q 1/14; B60Q 1/1407; B60Q 1/1415; B60Q 1/1423; B60Q 1/143; B60Q 1/1438; B60Q 1/1446; F21S 48/00
USPC ...... 315/113, 294, 291, 297; 362/249.2, 800, 362/276, 802
See application file for complete search history.

(56) References Cited

U.S. PATENT DOCUMENTS

| | | | | |
|---|---|---|---|---|
| 5,489,771 | A | * | 2/1996 | Beach et al. ................... 250/205 |
| 5,783,909 | A | * | 7/1998 | Hochstein .......... H05B 33/0818 |
| | | | | 315/158 |
| 6,703,677 | B2 | | 3/2004 | Lee et al. |
| 6,807,202 | B1 | | 10/2004 | Plamper et al. |
| 7,286,581 | B2 | | 10/2007 | Coleman |

(Continued)

*Primary Examiner* — Christian L Garcia
(74) *Attorney, Agent, or Firm* — Suiter Swantz pc llo

(57) ABSTRACT

The stabilization of a light-emitting diode (LED) calibration standard includes a light-emitting diode (LED), or an array of LEDs; a cylindrical hood surrounding the LED; an interior baffle for keeping the light output of the LED, and ambient light from behind the LED, from escaping to the other side; a photodetector for receiving the light output of the LED and generating a signal proportional to luminous output; and a hood surrounding the photodetector. A variable current source receives the signal and stabilizes the LED light output by adjusting the operating current of the LED to maintain a constant light output from the LED.

23 Claims, 5 Drawing Sheets

(56) References Cited

U.S. PATENT DOCUMENTS

| | | | |
|---|---|---|---|
| 2002/0190194 A1* | 12/2002 | Birrer | G01J 1/04 250/214 R |
| 2006/0039434 A1* | 2/2006 | Coleman | 372/50.1 |
| 2007/0045524 A1* | 3/2007 | Rains | F21K 9/00 250/228 |
| 2008/0251690 A1 | 10/2008 | Keiper et al. | |
| 2011/0279036 A1 | 11/2011 | Muray et al. | |
| 2011/0291564 A1* | 12/2011 | Huang | F21V 23/0457 315/77 |
| 2012/0025715 A1* | 2/2012 | Picciotto | H05B 37/0218 315/152 |
| 2012/0140472 A1* | 6/2012 | Naegele | G01J 1/08 362/249.02 |

* cited by examiner

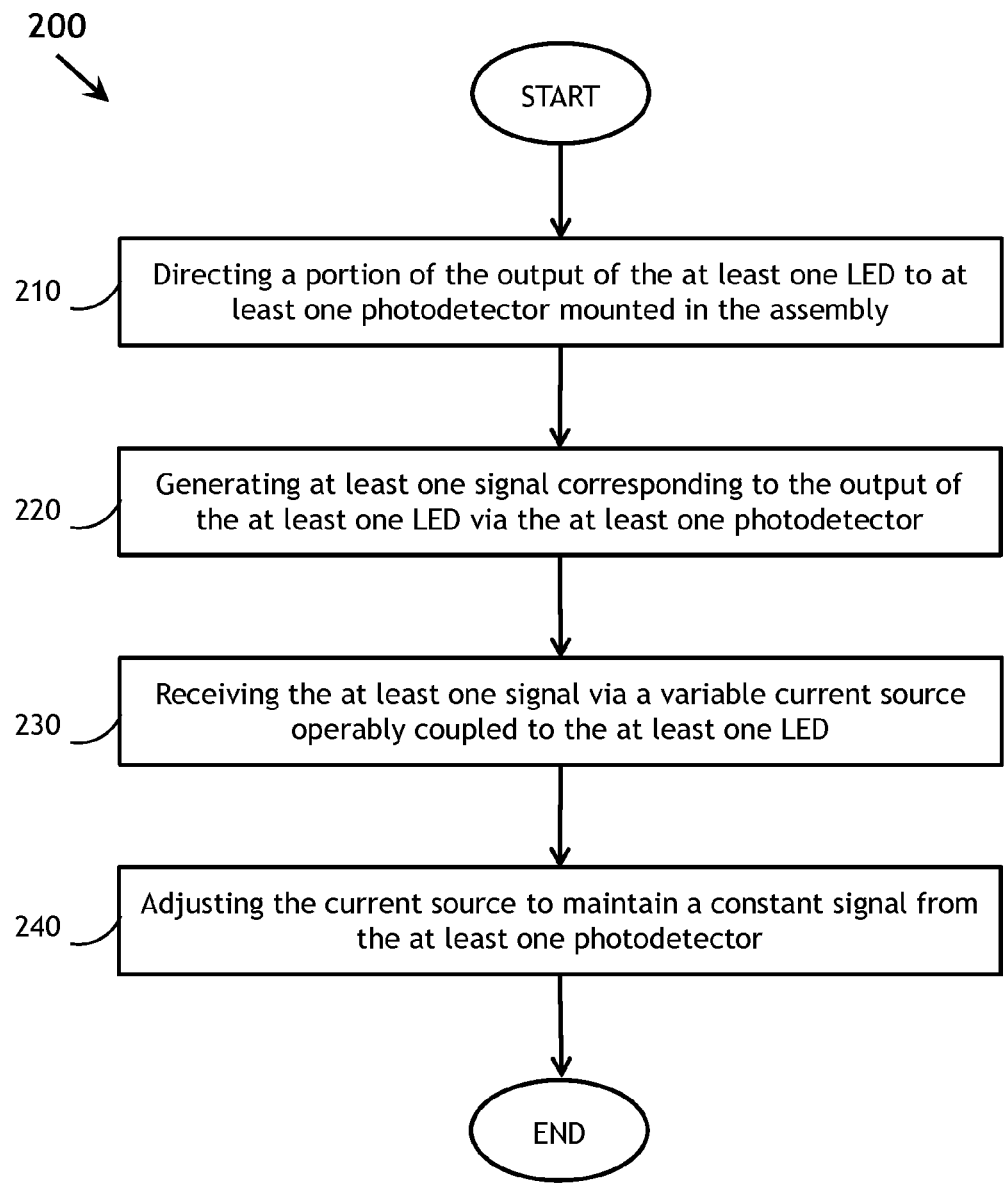

LED CALIBRATION STANDARD HAVING FAST STABILIZATION AND LASTING STABILITY

CROSS-REFERENCE TO RELATED APPLICATIONS

This application claims priority under 35 U.S.C. §119(e) to provisional patent application U.S. Ser. 61/807,659, filed on Apr. 2, 2013. Said application is hereby incorporated by reference herein in its entirety.

TECHNICAL FIELD

Embodiments of the present disclosure relate generally to optical metrology systems and particularly to systems and methods for calibrating metrology systems utilizing light emitting diodes (LED).

BACKGROUND

A light-emitting diode (LED) standard for calibrating a lighting metrology system must first be calibrated for total luminous flux, chromaticity, or other properties and then kept stable. This is generally done via stabilization of the operating current and temperature of the LED. However, this process cannot guarantee stable light output, which may fluctuate during the necessary seasoning process (typically by 5-10% over the first 1,000-2,000 hours of life) and decline during the normal useful life of the LED (typically by 15-30% over ~50,000 hours). Such variations far exceed the generally acceptable 1-3% level of uncertainty required for calibration standards.

To mitigate these instabilities, users generally season the LED for ~2,000 hours before using the standard for calibrations. Users may additionally recalibrate the LED after every ~100 hours of use, which can result in significant development and production delays. Furthermore, the LED generally requires a short period of stabilization after being activated, from several minutes to tens of minutes. While closed-loop active temperature control has attempted to mitigate this problem, the LED is still unusable during this warm-up period, which results in further short-term delays in equipment calibration and general productivity. It may therefore be desirable to accelerate stable operation of the LED in the short term. It may also be desirable to ensure stable long-term operation of the LED while eliminating delays associated with the seasoning and recalibration processes.

SUMMARY

Embodiments of the present invention concern a method and apparatus for stabilizing at least one light-emitting diode (LED) standard for calibrating a lighting metrology system. In one embodiment, an LED standard may include total luminous flux, total radiant flux, luminous intensity, radiant intensity, chromaticity, or other properties. In one embodiment, an LED assembly includes an LED and a photodetector configured to receive a portion of the luminous output of the LED. In one embodiment, the photodetector may generate an output signal proportional to the luminous output of the LED. In one embodiment, the output signal may then be sent to a controllable current source, and the control loop may adjust the operating current of the LED to maintain a constant output signal from the photodetector. In some embodiments, the LED assembly may include an array of LEDs or LED luminaires controlled by a single control loop, or multiple LEDs each controlled by an individual control loop.

In one embodiment, the LED and photodetector are mounted into a hood configured to wholly or partially surround the LED and the photodetector. In one embodiment, the hood is generally cylindrical in shape and equipped with a circular opening at its top basal surface through which a dome lens of the LED may protrude. In one embodiment, the interior of the hood may include a baffle configured to prevent ambient light from behind the LED from entering the front side of the LED and to prevent the light output of the LED from escaping. In preferred embodiments, the interior of the hood and the baffle are colored white for maximum reflectivity without changing the color of visible light. The photodetector may be mounted so as to directly face the LED and receive a portion of its light output through free space; a lens, filter, or aperture may be positioned between the LED and photodetector to manipulate the light output. In some embodiments, the photodetector may be mounted to face in a different direction or in a different location (e.g., behind the baffle) and the light output directed to the photodetector by way of mirrors, prisms, optical fibers, light guides, or other like optical devices.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which:

FIG. 2 is a process flow diagram of a method of stabilizing the output of an LED assembly according to the present invention.

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1A:
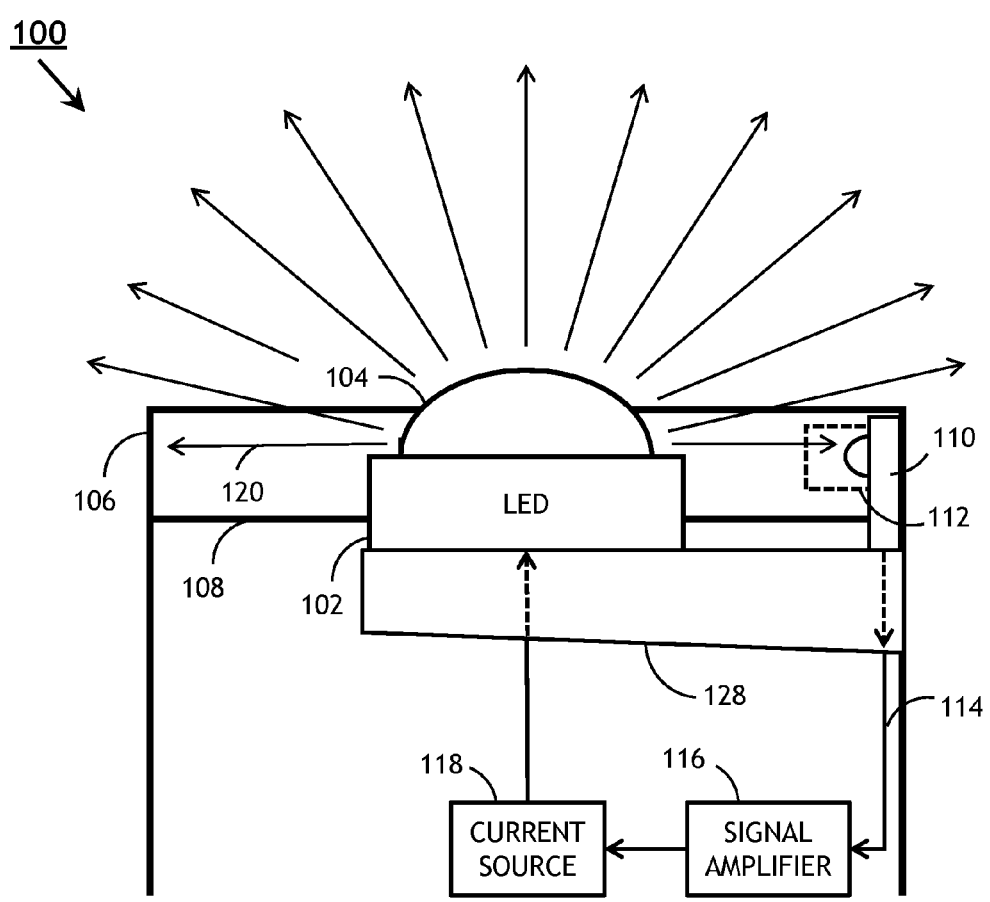
FIG. 1A is a diagrammatic illustration of an embodiment of an LED assembly according to the invention.

FIGS. 1A through 1D illustrate embodiments of an LED assembly 100 according to the present invention. Referring to FIG. 1A, in one embodiment, LED assembly 100 includes an LED 102 mounted in LED hood 106. For example, LED hood 106 may include a Φ25 mm cylinder with an open front end. In one embodiment, LED 102 may include dome lens 104. In one embodiment, LED assembly 100 may include a baffle 108. In one embodiment, LED 102 may be mounted near flush with the opening of LED hood 106 so that nearly all luminous output 120 in the forward 2π solid angle freely exits LED hood 106.

In one embodiment, a portion of luminous output 120, at a nearly 90° angle to normal, is blocked by LED hood 106. A portion of this light output 120 may then be received by photodetector 110. In one embodiment, photodetector 110 may be mounted below the opening of LED hood 106, facing LED 102. In one embodiment, baffle 108 may be configured to divide the interior of LED hood 106 into a front portion, wherein LED 102 and photodetector 110 may be mounted, and a rear portion behind LED 102. In one embodiment, baffle 108 may be further configured to prevent any ambient light from entering the front portion of the interior of LED hood 106. In one embodiment, baffle 108 may be further configured to prevent any luminous output 120 from escaping from the front portion of the interior of LED hood 106 into the rear portion. In one embodiment, the interior surfaces of both LED hood 106 and baffle 108 may include a highly reflective coating (e.g., a white coating) to promote reflection of all visible wavelengths of light into the vicinity of LED 102 without changing the color of the light. In one embodiment, photodetector 110 may be configured to output a signal 114 which may control the operating current of LED 102. In one embodiment, controllable current source 118 of LED assembly 100 may pre-select a target signal value so that the control loop may continually adjust the operating current of LED 102 to maintain a constant photodetector output signal 114, resulting in a constant luminous output 120. In one embodiment, LED assembly 100 may additionally include a signal amplifier 116 for receiving signal 114 and passing the amplified signal to controllable current source 118. In some embodiments of LED assembly 100, a single control loop may control the operating current for multiple LEDs. In another embodiment, the LED assembly too may include multiple control loops, each controlling the operating current for an individual LED 102.

Figure 1B:
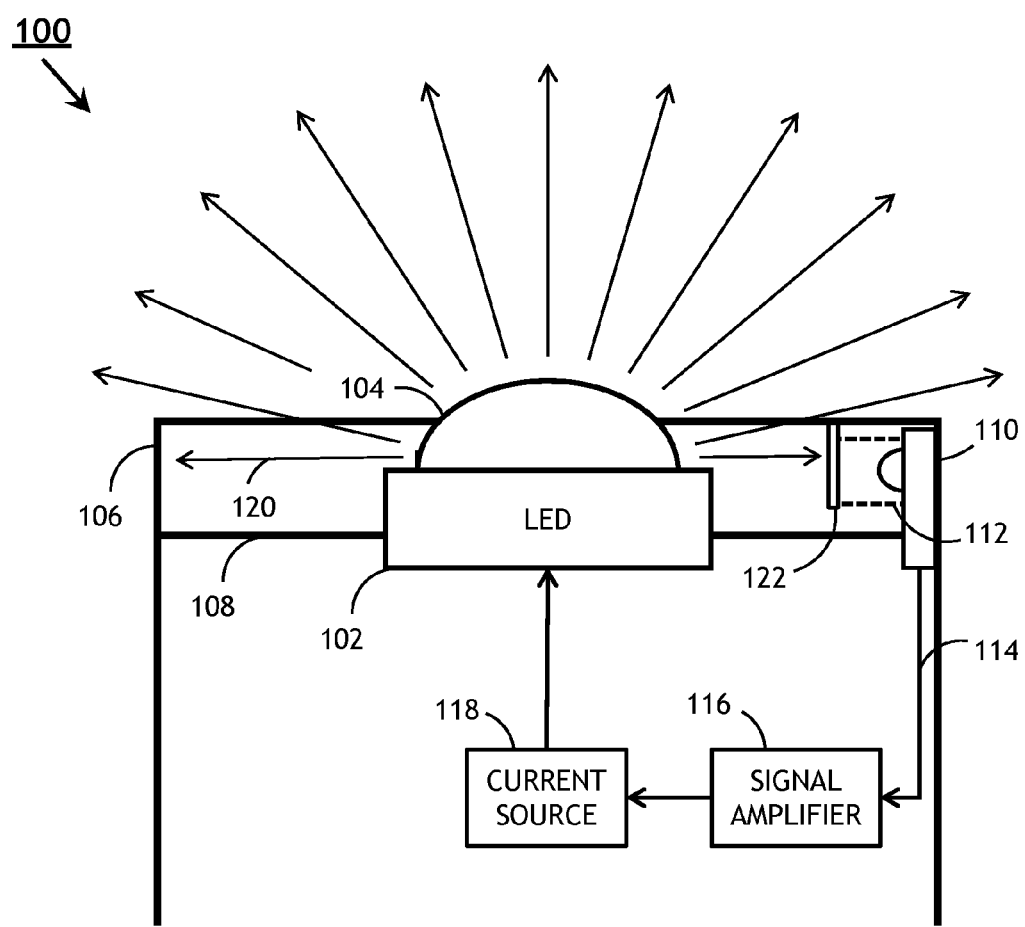
FIG. 1B is a diagrammatic illustration of an embodiment of an LED assembly according to the invention.
Figure 1C:
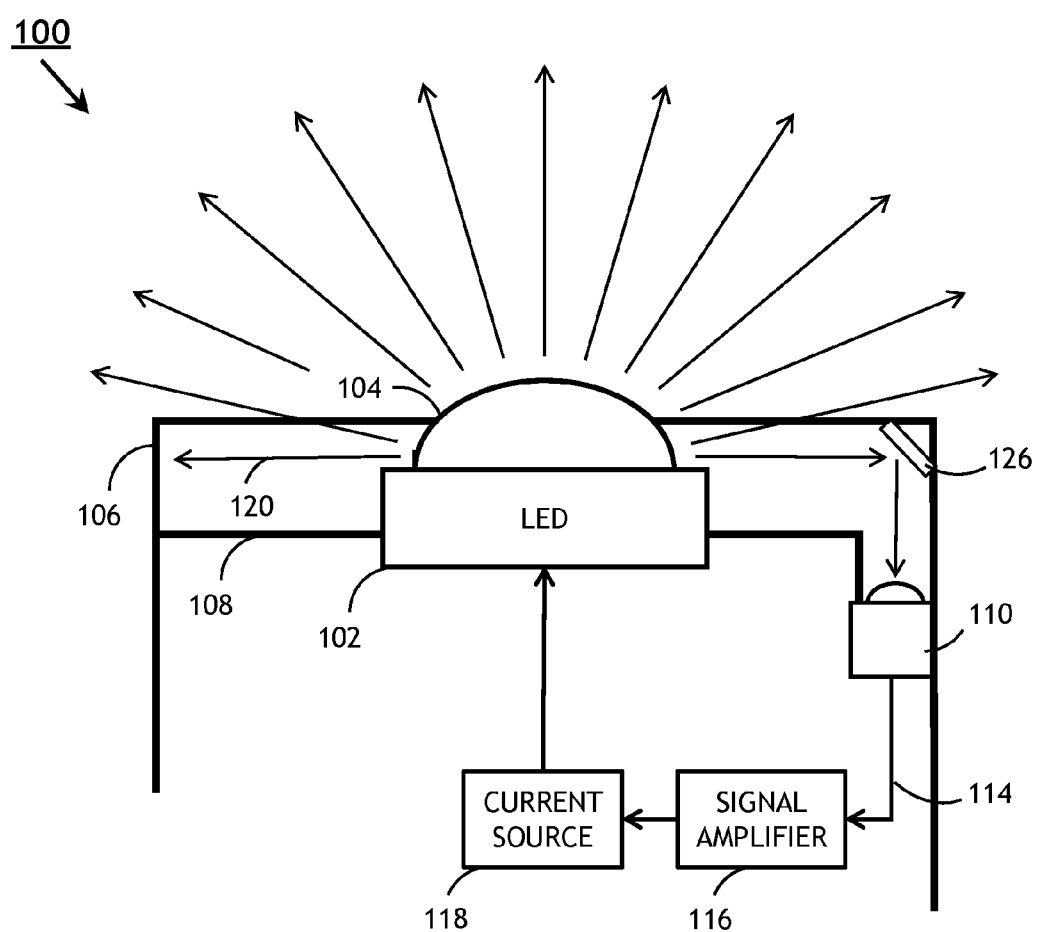
FIG. 1C is a diagrammatic illustration of an embodiment of an LED assembly according to the invention.

Referring to FIG. 1B, in one embodiment, LED assembly too may include at least one aperture or filter 122 mounted in front of the photodetector 110, configured to attenuate the light output 120 of LED 102 or to alter the spectrum of light output 120 so that photodetector 110 operates in its normal range of luminous intensity and wavelength. In one embodiment, photodetector 110 may be fitted with an optical filter with spectral transmittance, configured to produce a spectral response of the photodetector/filter combination equivalent to that of the human eye. In another embodiment, LED assembly too may include at least one lens configured to manipulate the light emission profile of LED 102 or the light collection profile of photodetector 110. Referring to FIG. 1C, in other embodiments photodetector 110 may be configured to face in other directions and mounted in other locations (e.g., beyond the baffle 108, in the rear portion of the interior of LED hood 106), with light output 120 directed from one or more LEDs 102 to the photodetector 110 via one or more mirrors 126, prisms, optical fibers, light guides or other optical devices.

Referring back to FIG. 1A, in one embodiment LED 102 and photodetector 110 may be mounted to temperature controlled heat sinks 128 to ensure they operate at a constant temperature. In one embodiment, LED 102 and photodetector 110 may share heat sink 128. In other embodiments, LED 102 and photodetector 110 may be mounted to individual heat sinks. In one embodiment, photodetector 110 may include a photodetector hood 112 configured to prevent any light other than the luminous output 120 of LED 102 from entering the photodetector 110. In one embodiment, photodetector hood 112 may be cylindrical in shape with an open bottom, and include surfaces coated with reflective material (similarly to LED hood 106 and baffle 108).

Figure 1D:
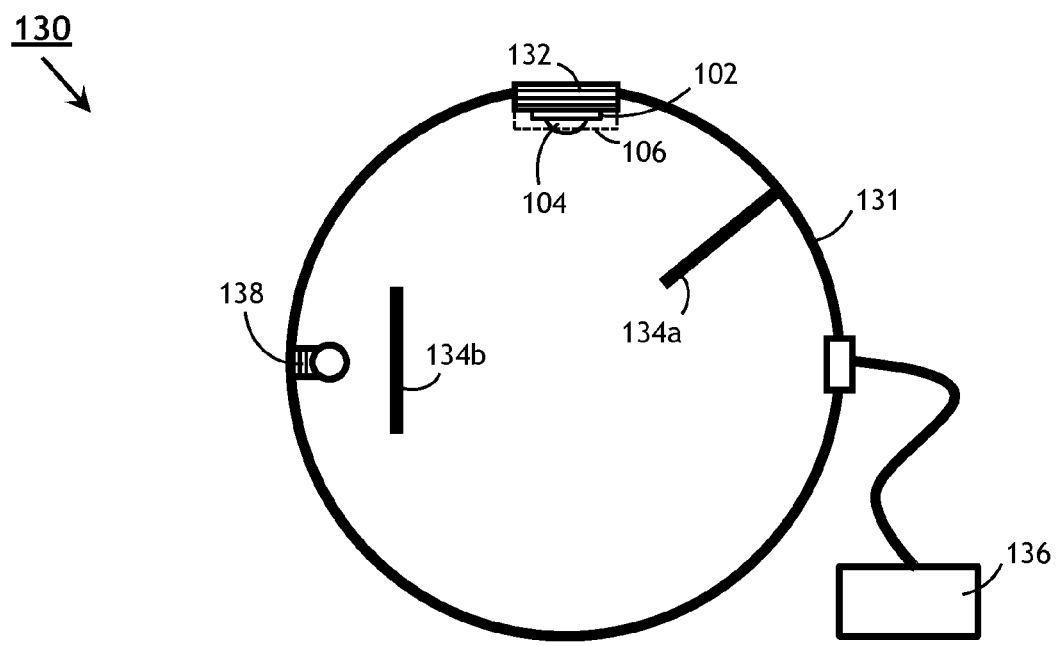
FIG. 1D is a diagrammatic illustration of an embodiment of an LED assembly mounted to an integrating sphere.

FIG. 1D illustrates an embodiment of an optical radiation metrology system 130 including an LED 102 with dome lens 104 mounted to the interior of integrating sphere 131. In one embodiment, LED hood 106 may be used as a coupler between LED 102 and a port 132 of an integrating sphere 131 when stabilizing the output of LED 102 prior to testing. In one embodiment, LED hood 106 may include a key and stopper (not shown) for ensuring constant orientation and amount of insertion into the port of the integrating sphere. In one embodiment, integrating sphere 131 may include baffles 134a and 134b and auxiliary lamp 138. In one embodiment, a spectrometer, or other photometric device 136 may be connected to the integrating sphere 131 to measure the light output of a light source under test after calibration of the system 130. The target light source to be measured may include an LED, an arc lamp, a plasma light source, an incandescent light source, a fluorescent light source, a laser, or another light source mounted to port 132 inside integrating sphere 131.

In one embodiment, the long-term stability of LED assembly too may be made dependent on the long-term stability of photodetector 110 rather than on the long term stability of LED 102. As the long-term stability of photodetector 110 is generally better than 1%, as opposed to the long-term stability of LED 102 operating under constant current and temperature (as discussed above), in one embodiment the long-term stability of LED assembly 100 may be improved by at least a factor of ten. In one embodiment, in addition to longer operational lifespan, the improved stability of the LED assembly too may prevent the need for frequent recalibration, reducing both ownership/ operation cost and downtime. In one embodiment, LED assembly too may stabilize faster in the short term once activated, particularly where LED 102 and photodetector 110 are independently temperature controlled, and the luminous output 120 of the LED 102 may be stabilized before thermal equilibrium of LED 102 is established. In one embodiment the ~2,000 hour (nearly three months) seasoning process may be eliminated, along with corresponding delays in productivity.

FIG. 2 illustrates a process flow diagram of a method 200 for stabilizing the output of at least one light-emitting diode (LED) mounted in an assembly according to an embodiment of the present invention. It is noted herein that the method 200 may be carried out utilizing any of the embodiments described previously. It is further noted, however, that method 200 is not limited to the components or configurations described previously as multiple components and/or configurations may be suitable for executing method 200.

At step 210, the method 200 directs a portion of the output of the at least one LED to at least one photodetector mounted in the LED assembly. In one embodiment, the output of the at least one LED is directed to the at least one photodetector through free space. In another embodiment, the output of the at least one LED is directed to the at least one photodetector through at least one of a lens, an aperture, and a filter. In another embodiment, the output of the at least one LED is directed to the at least one photodetector through an optical filter configured to convert the spectral response of the photodetector to substantially the spectral response of a human eye. In another embodiment, the output of the at least one LED is directed to at least one photodetector mounted in the assembly through at least one of a mirror, a prism, an optical fiber, and a light guide.

At step 220, the method 200 generates at least one signal corresponding to the output of the at least one LED via the at least one photodetector. At step 230, the method 200 receives the at least one signal via a variable current source operably coupled to the at least one LED. At step 240, the method 200 adjusts the current source to maintain a constant signal from the at least one photodetector. In one embodiment, the method 200 receives a preselected target value for the signal and maintains the received signal at the target value by adjusting the operating current of the at least one LED via a controllable current source. In another embodiment, the method 200 manually sets a preselected target value for the signal.

Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

I claim:

1. A method of stabilizing an output of at least one light-emitting diode (LED) mounted in an assembly used for calibrating one or more optical radiation metrology systems, comprising:
   preventing ambient light from passing between a first region of a hood of the assembly and a second region of a hood of the assembly via a baffle;
   directing a portion of the output of the at least one LED to at least one photodetector mounted within the first region of the hood, the first region including an opening configured to receive a protruding portion of the LED, the portion of the output including at least a first portion of unreflected output;
   generating at least one signal corresponding to the output of the at least one LED via the at least one photodetector;
   receiving the at least one signal via a variable current source electronically coupled to the at least one LED; and
   adjusting the variable current source to maintain a constant signal from the at least one photodetector.

2. The method of claim 1, wherein the directing a portion of the output of the at least one LED to at least one photodetector mounted in the assembly includes
   directing a portion of the output of the at least one LED to at least one photodetector mounted in the assembly through free space.

3. The method of claim 2, wherein the directing a portion of the output of the at least one LED to at least one photodetector mounted in the assembly through free space includes
   directing a portion of the output of the at least one LED to at least one photodetector mounted in the assembly through at least one of a lens, an aperture, and a filter.

4. The method of claim 3, wherein the directing a portion of the output of the at least one LED to at least one photodetector mounted in the assembly through at least one of a lens, an aperture, and a filter includes
   directing a portion of the output of the at least one LED to at least one photodetector mounted in the assembly through an optical filter configured to convert the spectral response of the photodetector to substantially the spectral response of a human eye.

5. The method of claim 1, wherein the directing a portion of the output of the at least one LED to at least one photodetector mounted in the assembly includes
   directing a portion of the output of the at least one LED to at least one photodetector mounted in the assembly through at least one of a mirror, a prism, an optical fiber, and a light guide.

6. The method of claim 1, wherein the adjusting the variable current source to maintain a constant signal from the at least one photodetector includes
   receiving a preselected target value for the signal; and
   maintaining the received signal at the target value by adjusting the operating current of the at least one LED via a variable current source.

7. The method of claim 6, wherein the receiving a preselected target signal value includes
   manually setting a preselected target value for the signal.

8. An apparatus for stabilizing at least one luminous output standard, comprising:
  at least one light emitting diode (LED);
  a first hood including an opening, the opening configured to house a portion of the at least one LED;
  a baffle coupled to the interior of the hood and including an opening configured to house the at least one LED, the baffle configured to:
    divide the interior of the hood into a first region and a second region,
    block the output of the at least one LED from passing from the first region to the second region, and
    block ambient light from passing from the second region to the first region;
  at least one photodetector mounted to the interior surface of the hood within the first region and configured to generate a signal based on a received portion of the output of the at least one LED; and
  a variable current source electronically coupled to the at least one LED and electronically coupled to the at least one photodetector, configured to:
    receive the signal generated by the at least one photodetector and control the operating current of the at least one LED based on the received signal.

9. The apparatus of claim 8, wherein the at least one luminous output standard includes at least one of total luminous flux, total radiant flux, luminous intensity, radiant intensity, and chromaticity.

10. The apparatus of claim 8, wherein the at least one photodetector is configured to receive through free space a portion of the output of the at least one LED.

11. The apparatus of claim 8, wherein the first hood is cylindrical in shape.

12. The apparatus of claim 8, wherein
  the at least one LED includes a domed lens; and
the hood includes a circular opening configured to house a portion of the domed lens.

13. The apparatus of claim 8, further comprising:
  at least one of a lens, an aperture, and a filter mounted between the at least one LED and the at least one photodetector and configured to adjust the output of the at least one LED received by the at least one photodetector.

14. The apparatus of claim 13, wherein the at least one of a lens, an aperture, and a filter includes
  an optical filter configured to convert the spectral response of the photodetector to substantially the spectral response of a human eye.

15. The apparatus of claim 8, wherein the at least one photodetector is configured to receive a portion of the output of the at least one LED through at least one of a mirror, a prism, an optical fiber, and a light guide.

16. The apparatus of claim 8, wherein at least one of the interior of the first hood and the baffle are coated with reflective material.

17. The apparatus of claim 8, wherein the at least one photodetector includes a second hood configured to shield the at least one photodetector from light output not originating from the at least one LED.

18. The apparatus of claim 8, wherein the at least one LED and the at least one photodetector are operably coupled to at least one of a heat sink and a temperature control device.

19. The apparatus of claim 8, wherein the variable current source is configured to receive a preselected target signal value and to maintain the received signal at the target value by adjusting the operating current of the at least one LED.

20. The apparatus of claim 8, further comprising:
  at least one signal amplifier electronically coupled to the at least one photodetector and the variable current source and configured to:
    receive the signal generated by the at least one photodetector,
    amplify the received signal, and
    transmit the amplified signal to the current source.

21. The apparatus of claim 8, wherein the apparatus is embodied in an integrating sphere operably coupled to at least one photometric device configured to measure the light output of at least one light source under test.

22. The apparatus of claim 21, wherein the photometric device includes at least one of a photometer, a photodetector, and a spectrometer.

23. The apparatus of claim 21, wherein the light source under test includes at least one of an LED, an arc lamp, a plasma light source, an incandescent light source, a fluorescent light source, and a laser.

* * * * *